UNITED STATES PATENT OFFICE.

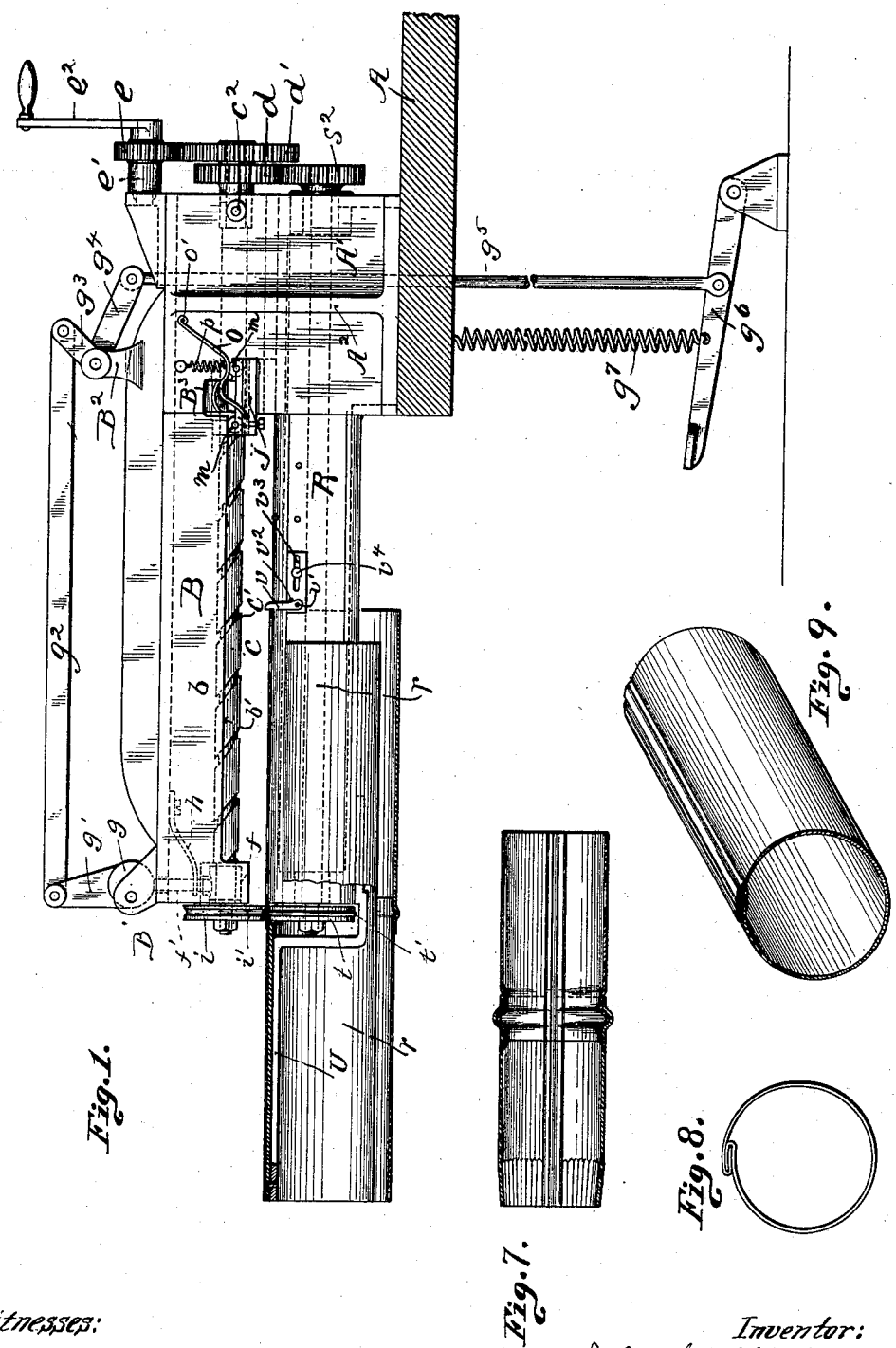

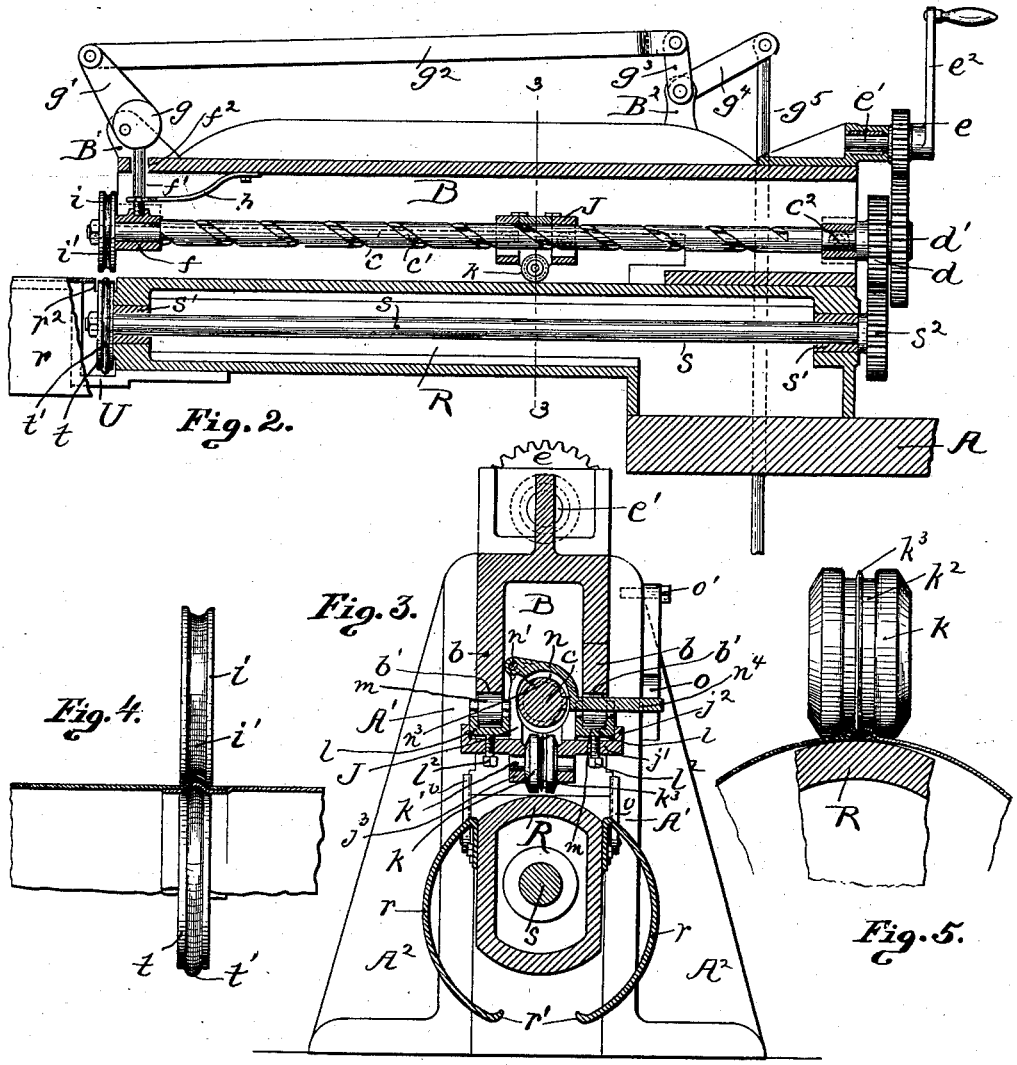

JOHN WM. ABRAHAMS, OF ALLEGHENY, PENNSYLVANIA, ASSIGNOR TO CHARLES A. BERTSCH, OF CAMBRIDGE CITY, INDIANA.

PIPE-JOINING APPARATUS.

SPECIFICATION forming part of Letters Patent No. 628,643, dated July 11, 1899.

Application filed July 14, 1898. Serial No. 685,896. (No model.)

*To all whom it may concern:*

Be it known that I, JOHN WM. ABRAHAMS, a resident of Allegheny, in the county of Allegheny and State of Pennsylvania, have invented a new and useful Improvement in Pipe-Joining Apparatus; and I do hereby declare the following to be a full, clear, and exact description thereof.

My invention relates to apparatus for joining sheet-metal pipe, as well as to the special form of joint obtained.

The object of my invention is to provide a form of apparatus by means of which the longitudinal and circumferential joints may be accurately and speedily formed, so as to produce joints of a strong and secure character which will prevent leakage without the use of solder or other sealing material.

To these ends my invention comprises the novel features set forth and claimed hereinafter.

To enable others skilled in the art to make and use my invention, I will describe the same more fully, referring to the accompanying drawings, in which—

Figure 1 is a side view of the apparatus, showing the operation of joining two sections of pipe circumferentially. Fig. 2 is a longitudinal section of same. Fig. 3 is an enlarged cross-section on the line 3 3, Fig. 2. Fig. 4 is an enlarged detail view of the beading-rollers in operation. Fig. 5 is a detail of the longitudinal seaming-roll in operation. Fig. 6 is an enlarged plan view of the carriage which carries the longitudinal seaming-roll. Fig. 7 is a sectional view of two of the jointed sections, illustrating my improved joint. Fig. 8 is an end view of pipe with edges hooked ready for seaming. Fig. 9 is a perspective view of a section of pipe, showing the longitudinal seam as finished.

Like letters indicate like parts in each of the figures.

The letter A designates a suitable table or bench which supports the apparatus and to which it is secured. The plates A' are erected on the table A, said plates being braced by the ribs $A^2$.

Secured to the plates A' and located between the same is the guide-frame B, which has the downwardly-projecting flanges $b$, whose lower edges form tracks $b'$ for the rollers of the carriage hereinafter referred to more fully.

Within the guide-frame B and extending longitudinally thereof is the shaft $c$, having the spiral groove $c'$ formed therein. One end of the shaft $c$ is hinged at $c^2$ within suitable bearings. This construction allows for a certain amount of vertical play on the part of said shaft for the purpose more fully hereinafter set forth.

To the outer end of the short shaft $c$ is secured the gear-wheel $d$ and beyond it the gear-wheel $d'$. The rotary motion is imparted to the shaft $c$ by means of the gear-wheel $e$ on the counter-shaft $e'$ meshing with the gear-wheel $d'$. A crank $e^2$ is provided for turning the shaft $e'$. The opposite end of the shaft $c$ is supported in the movable bearings $f$. An upright bar $f'$ extends up from the bearing $f$ through an opening $f^2$ in the guide-frame B. A cam $g$ is adapted to bear against the upper end of the bar $f'$, said cam being on the crank-arm $g'$, pivoted to the lug B' on the guide-frame B. A rod $g^2$ connects the crank-arm $g'$ to the link $g^3$, pivoted to the lug $B^2$. A lever $g^4$ is connected to the link $g^3$, and a rod $g^5$ connects the lever $g^4$ with the treadle $g^6$. A spring $g^7$ normally holds the cam $g$ in the position shown in Fig. 2. A strong leaf-spring $h$ is secured to the frame B and engages the bar $f'$ in such a manner as to hold said bar up in contact with the cam $g$.

Beyond the bearing $f$ is the beading-roll $i$, which has the groove $i'$ formed in its periphery. Supported on the shaft $c$ is the carriage J, which has the arched portion $j$, adapted to inclose the said shaft, and the outwardly-projecting plates $j'$, with the flanges $j^2$ formed thereon. Depending from the carriage J are the bearings $j^3$, in which the axle $k'$ of the longitudinal seaming-roll $k$ is supported. The roll $k$ revolves freely on its axle, and said roll travels on the mandrel below and which will be fully hereinafter described. This roll has the annular groove $k^2$ formed therein, and in said groove is the annular rib $k^3$.

Resting on the plates $j'$ are the tightening-plates $l$, which have the semicircular seats $l'$ formed in their sides to receive the axles $m'$ of the rollers $m$. The rollers $m$ are held up in contact with the track $b'$ of the frame B by means of the set-screws $l^2$, which pass up through threaded openings in the plates $j'$.

Pivoted to the lugs $J'$ on the carriage J is the nut $n$. The pin $n'$ passes through said lugs and the lugs $n^2$ on said nut. The nut has the quarter-thread $n^3$ formed therein, of the same pitch as the spiral groove $c'$ and adapted to engage said groove when lowered onto the same. Projecting out from the nut $n$ is the tongue $n^4$. In the path of the tongue $n^4$ is the inclined finger $o$, pivoted at $o'$ to the frame, up which the tongue $n^4$ travels as the carriage recedes and by means of which the nut $n$ is disengaged from the spiral shaft $c$. The frame B is cut away, as at $B^3$, to permit of the tongue being drawn up out of the way, as ordinarily said tongue is held down by moving along the tracks $b'$, so as to hold the nut $n$ in engagement with the spiral groove in the manner fully hereinafter set forth. To aid the spring $o$, an auxiliary spring $p$ is secured to said spring and to the frame B.

Below the guide-frame B is the mandrel R, which is supported, like said frame, between the plates $A'$. For a portion of its length said mandrel has the cylindrical gage $r$ secured thereto, which has the gap $r'$. This gap permits of the gage being collapsed or compressed, so as to allow for the withdrawal of the pipe after the beading operation, while at the same time the resiliency of the metal of the gage acts to hold the pipe encircling it firmly in position during the beading and seaming operation. The outward thrust of this longitudinally-divided gage keeps the pipe from moving and holds the sections in alinement, so that a straight perfect joint can be obtained.

Projecting out beyond the mandrel R is the bar U, which also acts to support the cylindrical gage $r$ beyond the mandrel, where said gage is adapted to receive and support the section of pipe being fed to the machine for the seaming operation or support it during the beading operation. The gage $r$ is also provided with the slots $r^2$, which permit the beading and seeming rolls to act on the pipe. The length of the gage may vary according to circumstances.

Journaled in bearings $s'$ within the mandrel R is the shaft $s$. One end of said shaft has the gear-wheel $s^2$ secured thereto, with which the gear-wheel $d$ meshes. The opposite end of the shaft $s$ has the beading-roll $t'$ secured thereto, with the convex periphery $t'$ adapted to enter the groove $i'$ of the beading-roll $i$.

On the mandrel R is the stop $v$, which regulates the distance the pipe may be moved onto said mandrel. This regulates the amount of lap between the two sections to be united by the beading-rolls. This stop is pivoted at $v'$ and is held from swinging back by means of the stud $v^2$. A slot $v^3$ permits of the adjustment of the stop at different positions, said stop being held in place by the clamp-nut $v^4$.

I do not wish to limit myself to the particular construction of apparatus shown and described, but wish to include within the scope of my invention such changes and modifications as may be found necessary or expedient.

The operation of the apparatus in seaming and bending is as follows: The pipe has its longitudinal edges lapped over in such a manner as to form an interlocking joint when engaging with each other. One manner of joining the edges is clearly illustrated in Fig. 8. The pipe in this form is opened out or expanded by the operator sufficiently to permit of its encircling the mandrel and gage. The lapped edges are then hooked together, as shown in Fig. 8. When the pipe has thus been properly adjusted on the mandrel with the seam up in such position as to be in the path of the roller $k$, power is applied to rotate the shaft $c$. The operator by pressing down on the tongue $n^4$ forces the thread $n^3$ of the nut $n$ into engagement with the spiral groove $c'$. In this manner motion is imparted to the carriage J. It is only necessary for the operator to hold the tongue down until the tongue passes under the frame B or the tracks $b'$. The roller $k$ then moves onto the seam and compresses the previously-formed seam in such a manner as to bind the layers of metal tightly together. Furthermore, the rib $k^3$ on said roller $k$ is forced into the metal, acting to depress it and interlock it, so that all liability of the seam separating or pulling apart is obviated. The result of this depressing action of the rib is clearly illustrated in Fig. 9, which shows the finished joint. After the carriage has traveled the length of the shaft $c$ the seaming operation will be complete. By reversing the shaft $c$ the carriage travels back to its original position. When the tongue $n^4$ of the nut $n$ reaches the inclined finger $o$, it travels up said finger and lifts the nut $n$ from engagement with the shaft $c$ up into the recess $B^3$. The shaft $c$ is then free to rotate without any movement on the part of said carriage.

I will now describe the beading operation. The section just seamed is drawn along the mandrel and cylindrical gage until it passes beyond the beading-rolls, and another section is then adjusted onto the mandrel and seamed in the same manner. The two sections to be joined having first been thus seamed longitudinally have the end of one section inserted into the adjoining end of the other section. This of course requires a reduction in the diameter of one of the sections, which may be accomplished by fluting one end, as shown in Fig. 7. The sections to be joined with the proper amount of lap, which is regulated by the stop $v$, are in proper position between the faces of the beading-rolls $t$ $i$. The operator then lowers the treadle $g^6$, and through the connections referred to the cam $g$ is brought to the position shown in Fig. 1. This forces the beading-roll $i$ down into contact with the metal. By rotating the shafts $c$ and $s$ the rolls $i$ $t$ are revolved and the annular beading is formed around the pipe, joining the two sections securely together. When the beading operation is finished, the operator removes his foot from the treadle and the cam resumes the position shown in Fig. 2, whereupon the roll $i$ is raised. Owing to the fact that the beading-roll $t$ is of smaller diameter than the pipe and that the cylindrical gage $r$ will yield under pressure the pipe may be readily removed from the mandrel, even though the convex rim of the roll $t$ extends above the line of the mandrel. In this manner I provide a tight and durable joint without the use of soldering material or rivets.

What I claim as my invention, and desire to secure by Letters Patent, is—

1. In pipe-joining apparatus, the combination with a suitable frame, of a mandrel, a longitudinally-movable carriage, a compressing-roll on said carriage adapted to compress the longitudinal seam of the pipe, said roll having an annular groove in its periphery and a projection in said groove, substantially as set forth.

2. In pipe-joining apparatus, the combination with a suitable frame, of a mandrel, a longitudinally-movable carriage, a compressing-roll on said carriage adapted to compress the longitudinal seam of the pipe, said roll having an annular groove in its periphery and an annular rib in said groove, substantially as set forth.

3. In pipe-joining apparatus, the combination with a suitable frame, of a mandrel, a rotary shaft parallel therewith, a longitudinally-movable carriage, connections between said carriage and shaft, whereby the former is moved by the rotation of said shaft, and a roll on said carriage adapted to compress the longitudinal seam of the pipe, substantially as set forth.

4. In pipe-joining apparatus, the combination with a suitable frame, of a mandrel, a rotary shaft parallel therewith having a spiral groove therein, a carriage, a swinging nut on said carriage having a thread adapted to engage said spiral groove, and a roll on said carriage adapted to compress the longitudinal seam of the pipe, substantially as set forth.

5. In pipe-joining apparatus, the combination with a suitable frame, of a mandrel, a rotary shaft parallel therewith having a spiral groove therein, a carriage, a swinging nut on said carriage having a thread adapted to engage said spiral groove, mechanism for lifting said nut from engagement with said spiral groove, and a roll on said carriage adapted to compress the longitudinal seam of the pipe, substantially as set forth.

6. In pipe-joining apparatus, the combination with a suitable frame, of a mandrel, a rotary shaft parallel therewith having a spiral groove therein, a carriage, a swinging nut on said carriage having a thread adapted to engage said spiral groove, a tongue on said nut, an incline in the path of said tongue, and a roll on said carriage adapted to compress the longitudinal seam of the pipe, substantially as set forth.

7. In pipe-joining apparatus, the combination with a suitable frame, of a mandrel, a guide-frame above said mandrel, a rotary shaft extending longitudinally of said frame, a longitudinally-movable carriage, a compressing-roll on said carriage adapted to compress the longitudinal seam of the pipe, vertically-adjustable rollers on said carriage engaging the lower faces of said guide-frame, substantially as set forth.

8. In pipe-joining apparatus, the combination with a suitable frame, of a mandrel, a guide-frame above said mandrel, a rotary shaft extending longitudinally of said frame, a longitudinally-movable carriage, a compressing-roll on said carriage adapted to compress the longitudinal seam of the pipe, movable plates on said carriage, rollers journaled in said plates adapted to engage the lower face of said guide-frame, and means for raising and lowering said plates, substantially as set forth.

9. In pipe-joining apparatus, the combination with a suitable frame, of a mandrel, joining mechanism, and a yielding cylindrical gage adapted to support the pipe during the joining operation, substantially as set forth.

10. In pipe-joining apparatus, the combination with a suitable frame, of a mandrel, joining mechanism, a cylindrical yielding gage, said gage having a longitudinal gap, substantially as set forth.

11. In pipe-joining apparatus, the combination with a suitable frame, of a mandrel, joining mechanism, and curved yielding plates, depending from said mandrel, substantially as set forth.

12. In pipe-joining apparatus, the combination with a suitable frame, of a mandrel, and curved yielding plates depending from said mandrel, said plates having inwardly-turned edges, substantially as set forth.

In testimony whereof I, the said JOHN W. ABRAHAMS, have hereunto set my hand.

JOHN WM. ABRAHAMS.

Witnesses:
LINDSAY DE B. LITTLE,
JAMES I. KAY.